United States Patent [19]
Hartwig

[11] Patent Number: 4,761,591
[45] Date of Patent: Aug. 2, 1988

[54] RPM REGULATION OF AN ELECTROMOTOR

[75] Inventor: Jürgen Hartwig, Karlsruhe-Durlach, Fed. Rep. of Germany

[73] Assignee: Pfaff Haushaltmaschinen GmbH, Fed. Rep. of Germany

[21] Appl. No.: 27,492

[22] Filed: Mar. 18, 1987

[30] Foreign Application Priority Data

Mar. 21, 1986 [DE] Fed. Rep. of Germany ....... 3609566

[51] Int. Cl.$^4$ ............................................. H02P 5/00
[52] U.S. Cl. ................................. 318/345 D; 318/318; 318/341; 318/345 H
[58] Field of Search ............... 318/326, 318, 312, 341, 318/345 D, 345 H

[56] References Cited

U.S. PATENT DOCUMENTS

| | | | |
|---|---|---|---|
| 3,764,876 | 10/1973 | Arthur | 318/326 |
| 3,906,319 | 9/1975 | Milligan | 318/318 |
| 3,953,776 | 4/1976 | Wolf | 318/312 |
| 4,109,184 | 8/1978 | Weber | 318/341 X |
| 4,130,785 | 12/1978 | Pewet | 318/318 |
| 4,680,516 | 7/1987 | Guzik et al. | 318/318 X |
| 4,758,625 | 3/1986 | Nazarian | 318/318 |

Primary Examiner—Benjamin Dobeck
Attorney, Agent, or Firm—McGlew and Tuttle

[57] ABSTRACT

A device for regulating the RPM of an electromotor with an RPM generator coupled to it for generating pulses, measures the intervals between the pulses of a measure of the RPM of the motor. The device includes an oscillator for generating clock signals, which are transmittable to a counter, which counts the number of clock signals between successive pulses of the oscillator, a register, which accepts the counter indication and a device for generating a control value for correcting the RPM of the electromotor over a digital-to-analog converter connected in series to the motor. To generate the control value for regulating the RPM, and RC network containing a manually adjustable control resistance is provided, the capacitor of which can be short-circuited by a switch, which can be activated by an oscillator-driven contact mechanism. The capacitor is additionally connected to a circuit element for switching on the counter, whose switching off can be activated by the oscillator-driven contact mechanism.

17 Claims, 7 Drawing Sheets

4,761,591

RPM REGULATION OF AN ELECTROMOTOR

FIELD AND BACKGROUND OF THE INVENTION

The present invention relates in general to motor controls, and in particular to a new and useful device for controlling the rotational speed of an electromotor.

A motor control containing a microcomputer is known from German DE-OS No. 28 33 981. The control device contains a digital automatic control system which maintains a preset motor speed. In addition, a counter is provided, which counts the number of oscillator pulses during a clock pulse of a tachogenerator connected to the motor shaft. This number is then taken as the basis of the actual number of revolutions for calculating a revolution number error, compared to the desired revolution number. This revolution number error is then used to correct the motor revolution number.

With the known control, the actual number of revolutions is monitored, whereupon the actual number is registered toward the desired number of revolutions. A revolution number change to large number of desired revolution numbers is not intended.

SUMMARY OF THE INVENTION

The present invention is drawn to a digital control for phase angle driven motors which responds to different preset numbers of revolutions with simultaneous precise regulation of the motor revolution number to a preselected number.

By measuring the number of pulses of an oscillator during the charging time of a capacitor in an RC network up to a predetermined charge value, a parameter value is obtained which is simply determinable and digitally utilizable for a variable resistance use for determining the number of revolutions. A separate oscillator can be dispensed with.

An object of the present invention is thus to provide a device for regulating the RPM of a motor having an RPM generator for generating pulses with rotation of the motor, intervals of the pulses being a measure of the RPM of the motor, comprising an oscillator for generating clock signals, a counter for receiving the clock signals, the counter counting the number of clock signals between successive pulses of the RPM generator, a register for accepting a count from the counter, control value means for generating a control value for controlling the RPM of the motor, a digital-to-analog converter connected in series with the motor and connected to the control value means for applying the control value to the motor, the control value means comprising a RC-network containing a manually adjustable control resistor and a capacitor, a switch connected to the capacitor for short-circuiting the capacitor when the switch is activated, an oscillator-driven contact mechanism connected to the switch for activating the switch, and a circuit element connected to the contact mechanism for switching on the counter, the contact mechanism being connected to the counter for triggering the switching off of the counter.

A further object of the invention is to provide a comparator as the oscillator-driven contact mechanism, the comparator having one impute which receives a stabilized direct-current, another imput which is connected to a voltage divider and an output which is connected to the base of a switching transistor which forms the switch.

A still further object of the invention is to utilize a second comparator as the circuit element, the second comparator being connected over a diode to the output of the first mentioned comparator, the output of the first mentioned comparator also being connected to the input of the counter for triggering the starting process of a triac which is connected to the motor for driving the motor.

Another object of the invention is to provide a device wherein the circuit element is connected over a differentiating circuit for switching the input of the counter.

A still further object of the invention is to provide a device for regulating the RPM of a motor which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The invention is explained in conjunction with two embodiments shown in the drawing, in which.

DESCRIPTION OF THE PREFERRED EMBODIMENTS

Figure 1:
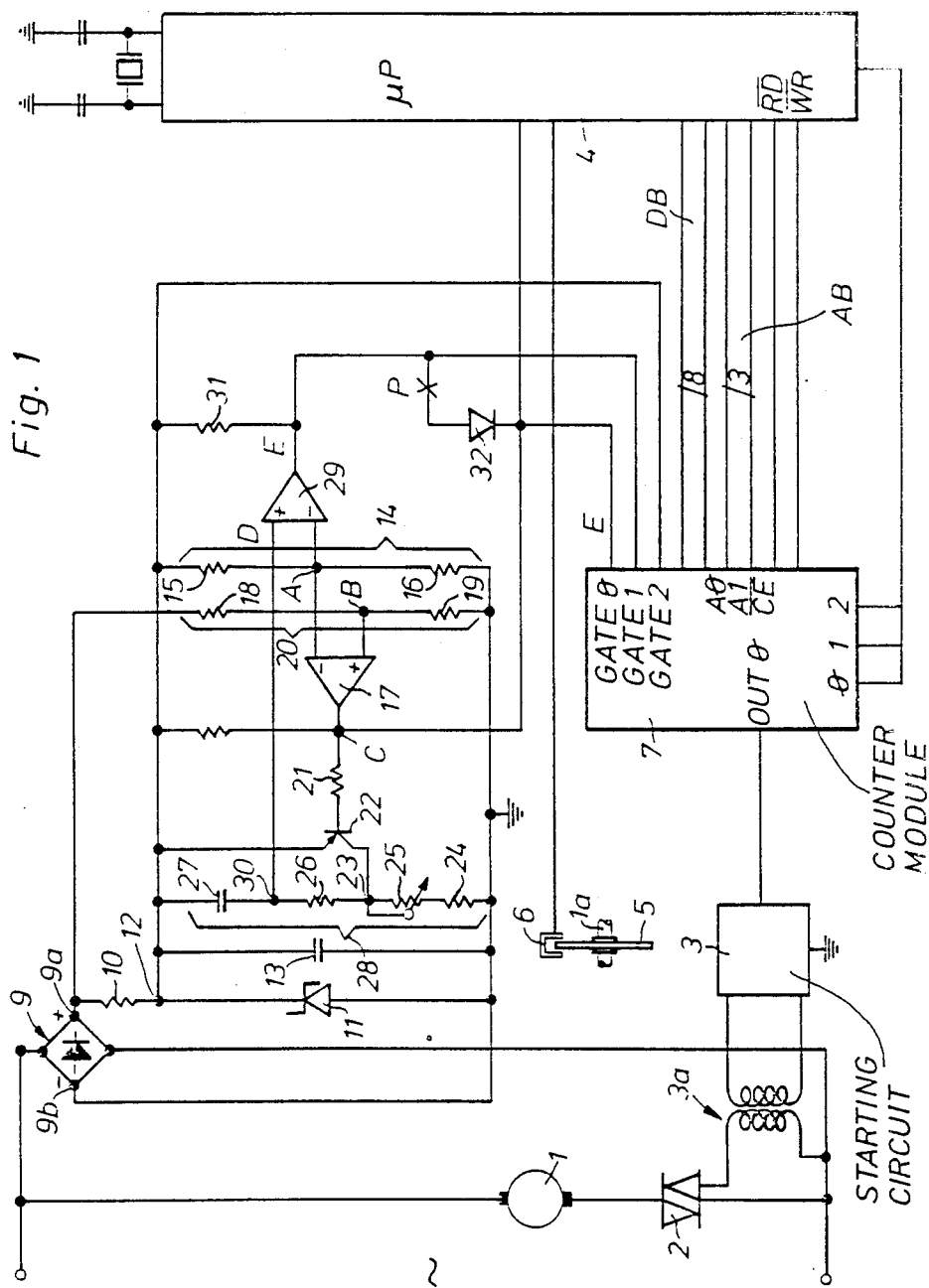
FIG. 1 is a schematic circuit of a first embodiment with a microcomputer for the speed control of a motor through phase angle control of a triac.
Figure 2:
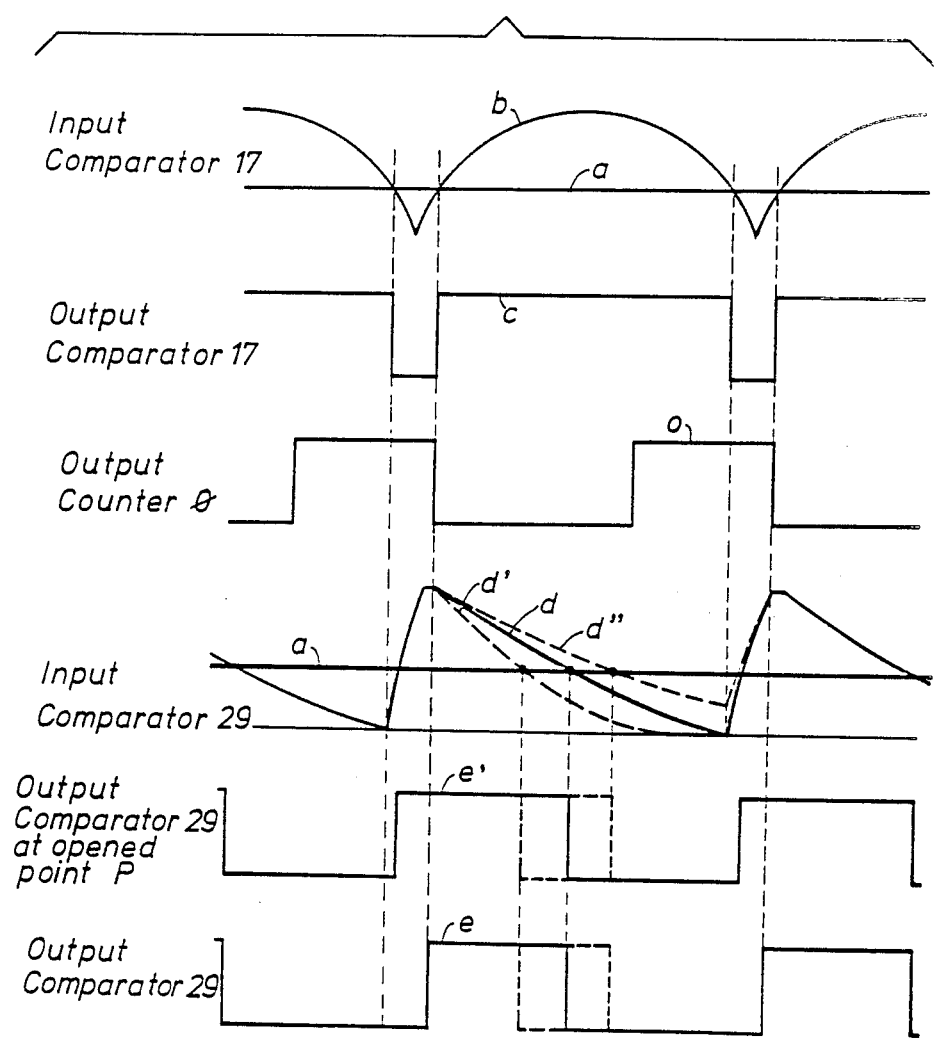
FIG. 2 is a graph that shows the course of the control current and level current at different points of the circuit.

Referring to the drawings in particular, the invention embodied in FIGS. 1 and 2 comprises a device for regulating the RPM (revolutions per minute) of an electromotor.

FIG. 1 shows a motor 1 which is connected to a supply of alternating current and which is also connected in series to a triac 2. The triac 2 is driven via a transformer 3a, with a starting circuit 3, which is connected to the output OUT ∅ of a counter module 7 containing three counters (Z0, Z1, and Z2), which are connected via a data bus DB to a microcomputer 4.

The counter module 7 is an 8253-5 component, which has, in addition to internal function groups, a data bus buffer, a read/write logic, a check word register, and three count-down 16-bit counters. The data bus buffer is a 3-state bidirectional 8-bit buffer and is the interface to the system data bus DB. It is essentially intended to carry out the functions and programming of different operating modes, loading the counter register and reading the counter content. The read/write logic accepts data on the data bus DB of the microcomputer 4 and generates control signals for driving the individual module functions. It is activated through the connection $\overline{CE}$ from an address bus AB of the microcomputer 4, which, in addition, has connections A0 and A1 for the selection of the three counters (Z0, Z1, Z2) of the counter module and the check word register. The logic of module 7 is, moreover, connected to the microcomputer 4 at inputs $\overline{RD}$ for reading the counter contents and $\overline{WR}$ for loading the counters, and for writing a check word for the counter state. The check word register contains information of the operational state of each counter (Z0, Z1, Z2), the selection of the number notation (binary or BCD), as well as for loading each counter register.

The three 16-bit counters (Z0, Z1, Z2) are identical countdown counters, which can work either in binary or in BCD (binary-coded decimal). The computer 4 can load and read the counters (Z0, Z1, Z2). The counting process is controlled by the particular GATE input (GATE Ø, GATE 1 or GATE 2). Since all three counters (Z0, Z1, Z2) work in the same counter state (MODE 0), only this will be described here. The counter output (OUT) voltage remains low while the counter modus is written on loading the particular counter (Z0, Z1, Z2) and during the counting process. When the particular counter (Z0, Z1, Z2) has reached NULL (the end of its count), the output voltage changes to high and remains in this state until a new check word is written in. The counters (Z0, Z1, Z2) count only as long as the voltage applied to their GATE input is high. Of the three counters, counter Z0 generates the starting pulse, counter Z1 measures the starting resistance and counter Z2 measures the periodic time of the tacho clock. All three counters (Z0, Z1, Z2) work with the frequency ALE generated by the internal oscillator of the computer 4. The output OUT Ø of the counter module 7 is connected to the output of the counter Z0.

A timing disk 5 is firmly connected to the motor shaft 1a of the motor 1, which acts in conjunction with a pulse generator 6. The timing disk 5 has a large number of line markings, from which the pulse generator 6 generates the pulse signals corresponding to the RPM. These are transmitted to the input TAKT of the microcomputer 4.

A rectifier 9 is connected to the alternating current. The negative terminal 9b of rectifier 9 is connected to ground, and the positive terminal 9a of rectifier 9 is connected, via a resistor 10 and a Zener diode 11, to ground. A capacitor 13 is connected to a connection 12 between the resistor 10 and the Zener diode 11. Capacitor 13 is grounded. A stabilized direct-current can thus be drawn over capacitor 13.

A voltage divider 14 is connected to connection 12 and consisting of resistors 15 and 16, with the resistor 16 connected to ground. The connection point A between the two resistors 15 and 16 is connected to the inverted input of a comparator 17, while at the non-inverted input of the comparator 17 the connecting point B of two resistors 18 and 19, lies. These resistors 18 and 19 form a voltage divider 20 and are connected between the connector 9a and ground. The output of the comparator 17 is connected across a resistance 21 with the base of pnp switching transistor 22, the emitter of which is connected to the connection 12, and the collector of which is connected to a connection 23. Connection 23 lies between two resistors 24 and 25 on one side, and a resistor 26 as well as a capacitor 27, on the other side. The resistors 24 to 26 and the capacitor 27 form an RC network 28 located between the connection point 12 and ground. The resistor 25 is fashioned as a potentiometer and, for practical reasons, is intended for manual operation.

The connection point A between the resistors 15 and 16 of the voltage divider 14 is also connected to the inverted input of another comparator 29, the non-inverted input of which is connected to a connection point 30 between the resistor 26 and the capacitor 27. The output of the comparator 29 is connected across a resistance 31 to the stabilized voltage of the connection point 12. In addition, the output of the comparator 29 is connected via a diode 32 to the GATE Ø of the first counter Z0 of the counter module 7. The output of comparator 29 is directly connected to the GATE 1 of the second counter Z1. The connection 12 is connected to the GATE 2 of the third counter Z2.

In FIG. 1, the comparator 17 thus acts as an oscillator-driven contact mechanism which is connected to the transistor switch 22 for activating the switch. The comparator 29 acts as a circuit element which is connected to the contact mechanism 17 for switching on the counter Z1. The contact mechanism 17 is also connected so that it can trigger the counter to switch the counter off.

The output of the comparator 17 is connected to the GATE Ø of the counter Z0 and to an input NULLD of the microcomputer 4.

The circuit functions in the following way:

The supply voltage is rectified by the bridge rectifier 9 so that at point 9a the positive voltage of a pulsating direct-current results. The bridge rectifier 9 operates therefore as an oscillator. At point 12, a direct-current largely stabilized by the Zener diode 11 and the capacitor 13, is obtained.

Figure 4:
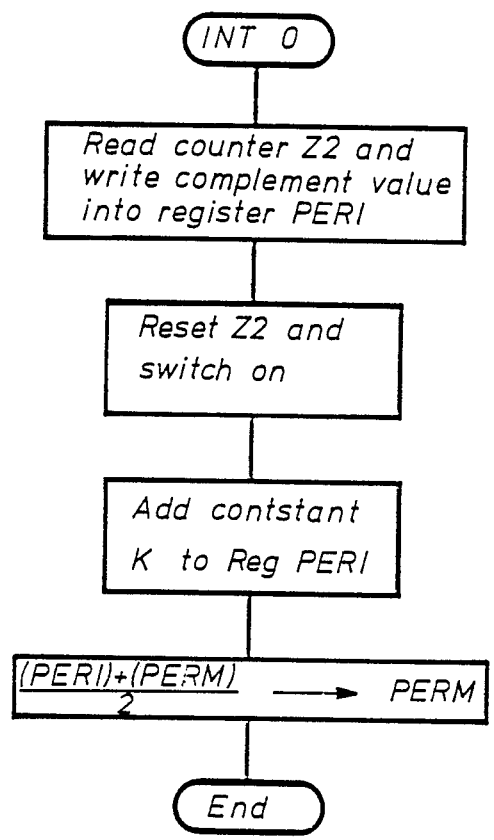

During the rotation of the motor 1, the timing disk 5 connected to the motor shaft 1a rotates and generates pulses in the clock generator 6, the trailing edges of which trigger at the input TAKT of the microcomputer 4 in every instance a program INT 0 (FIG. 4). During the program INT 0, the counter Z2 is read initially and subsequently cleared. As compensation for the time not switched on during the execution of the program INT 0, a constant "K" is added to the complemented value of the counter, Z2 and the result moved to register PERI. Subsequently, the mean value between the momentary value in register PERI and the previous mean value contained in a register PERM is determined in order to balance strong RPM deviations.

Figures 3, 5:
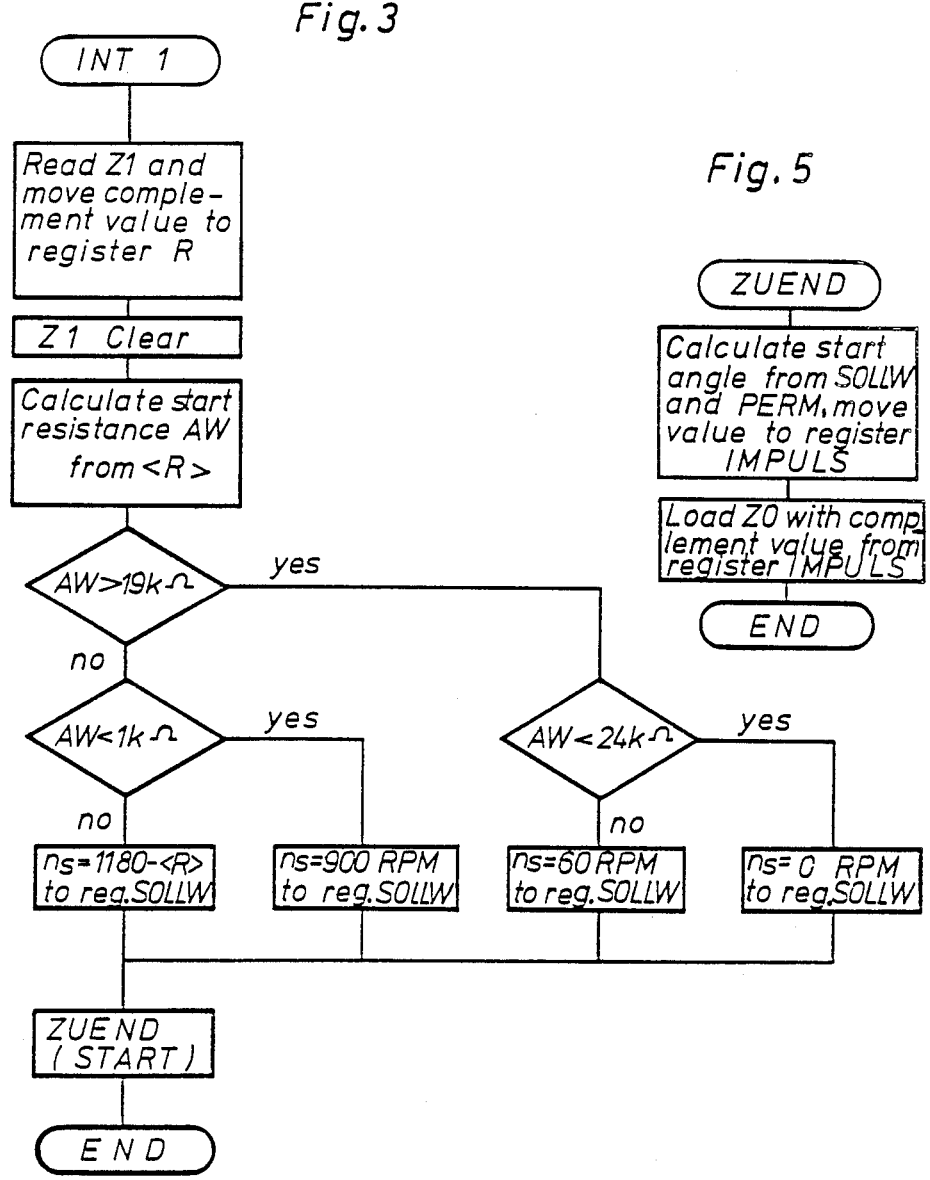
FIGS. 3 to 5 are flow diagrams with details of the program process steps of the programs stored in the program storage of the microcomputer.

At the inverted input of the comparator 17 (FIGS. 1 and 2) is a voltage at point A, given by the voltage divider 14, while at the non-inverted input B is a rectified supply voltage b decreased correspondingly by the voltage divider 20. In FIG. 2, the course of the particular voltage is shown. At the output C of the comparator 17, thus, rectangular pulses c occur, the trailing edges of which trigger every 10 msec via NULLD in the computer 4 a program INT 1 every 10 msec (FIG. 3). In addition, the rectangular pulses c are transmitted to the GATE Ø input of the counter Z0.

The trailing edge of the rectangular pulse c at the output C of the comparator 17 switches the transistor 22 to pass. Through this, the capacitor 27 is discharged over the small resistor 26, i.e. the voltage d at the connection point 30 increases rapidly to 5 volt according to an e-function. As soon as the voltage at the non-inverted input D of the comparator 29 exceeds again the voltage a at the inverted input A, the comparator 29 switches and the voltage at its output E would be high; the diode 32, however, keeps the voltage low. FIG. 2 shows these voltages. The output voltage of the comparator 29 is indicated at e' as it would be if a connection were to be opened at point P in FIG. 1. With the connected diode 32, the output voltage of the comparator 29 and with it also the GATE 1 of the counter Z1 is kept low, so that the counter Z1 does not yet count.

As soon as the voltage b at the non-inverted input B of the comparator 17 exceeds again the voltage a at the inverted input A, the voltage at the output C of the comparator 17 switches to high. Now, the output E of the comparator 29 can accept high voltage, since its potential no longer is kept low by the diode 32. With that, the counter Z1 is cleared and it starts its counting process. The leading edge of the rectangular pulse c simultaneously blocks the switching transistor 22. From this time on, the capacitor 27 is again charged via the resistors 24, 25 and 26. Depending on the setting of the resistor 25, charging takes place with different increases with the voltage d at the connection point 30 decreasing correspondingly. In FIG. 2, the course of the voltage d is shown at one set value of the resistor 25. The voltage drops d' and d'' at two other settings for the resistor 25 are shown in dashed lines.

As soon as the voltage at the non-inverted input D of the comparator 29 falls below the reference voltage at the inverted input A given by the voltage divider 14, the voltage at the output E of the comparator 29 switches to low and the counting process of the counter Z1 is blocked.

In the subprogram INT 1 (FIG. 3), the counter Z1 is read by the microcomputer 4, the value moved into a register R and the counter Z1, subsequently, cleared. It is then reset and switched to "gated", i.e. it only starts counting again when the voltage at the comparator 29 output is again high, that is, at the point, when charging of the capacitor 27 starts again. As soon as this charge exceeds the value determined by the reference voltage at the comparator 29, and its output receives again low voltage, the counter Z1 stops and is read by the next subprogram INT 1. On the basis of the counter indication, which corresponds to the elapsed time, the just set value of the resistor 25 is calculated. This is proportional to the elapsed time and thus, also to the counter indication.

It is now determined, whether the resistance 25 is greater than 24 KΩ, greater than 19 KΩ or smaller than 1 KΩ. In these cases, a reference value for the RPM of 0 RPM, of 60 RPM or of 900 RPM is taken as basis. If the resistance 25 is between 1 KΩ and 19 KΩ, the reference RPM and the time to the starting pulse are calculated from it. Corresponding to the RPM value valid at a given time, a register SOLLW is loaded with the reciprocal of this number.

In a subprogram ZUEND (FIG. 5), the starting angle for the control of the triac 2 is calculated from the values in the registers SOLLW and PERM and the value moved to register IMPULS. With the complement of the value from the register IMPULS, the counter Z0 is preset. It begins its down count when the output voltage of the comparator 17 and, thus, the voltage at its GATE input is high. With that, the start of the counter Z0 is independent of the different program execution times.

As soon as the counter Z0 reaches zero, a pulse is transmitted at the output OUT Ø of the counter module 7 (FIG. 1) to the starting circuit 3, which through connects the triac 2 via the transformer 3a. In this way, the RPM of the motor 1 adjusts to a value corresponding to that set at the resistor 25.

Figure 6:
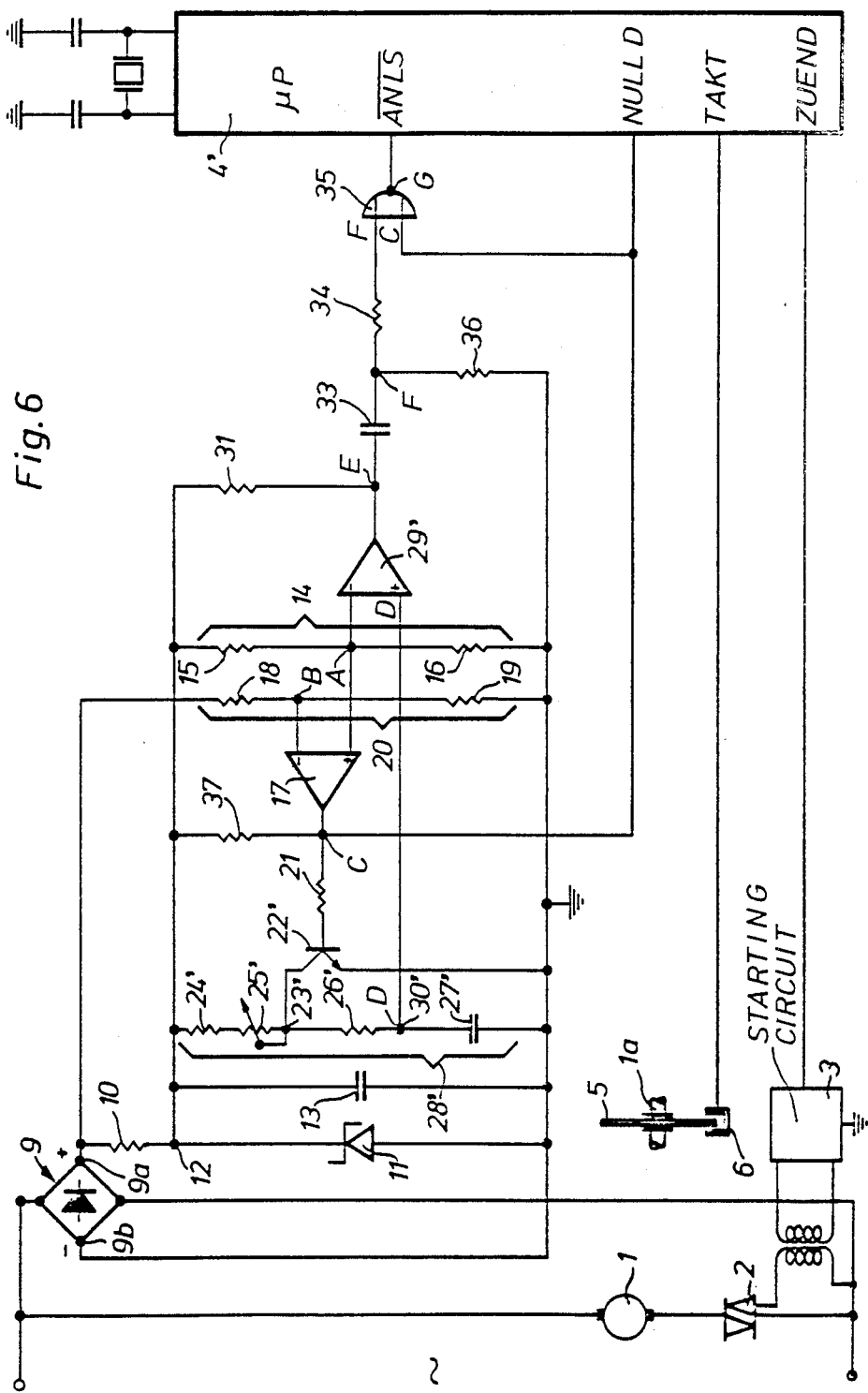
FIG. 6 is a schematic circuit of a second embodiment for RPM control of the motor.
Figure 7:
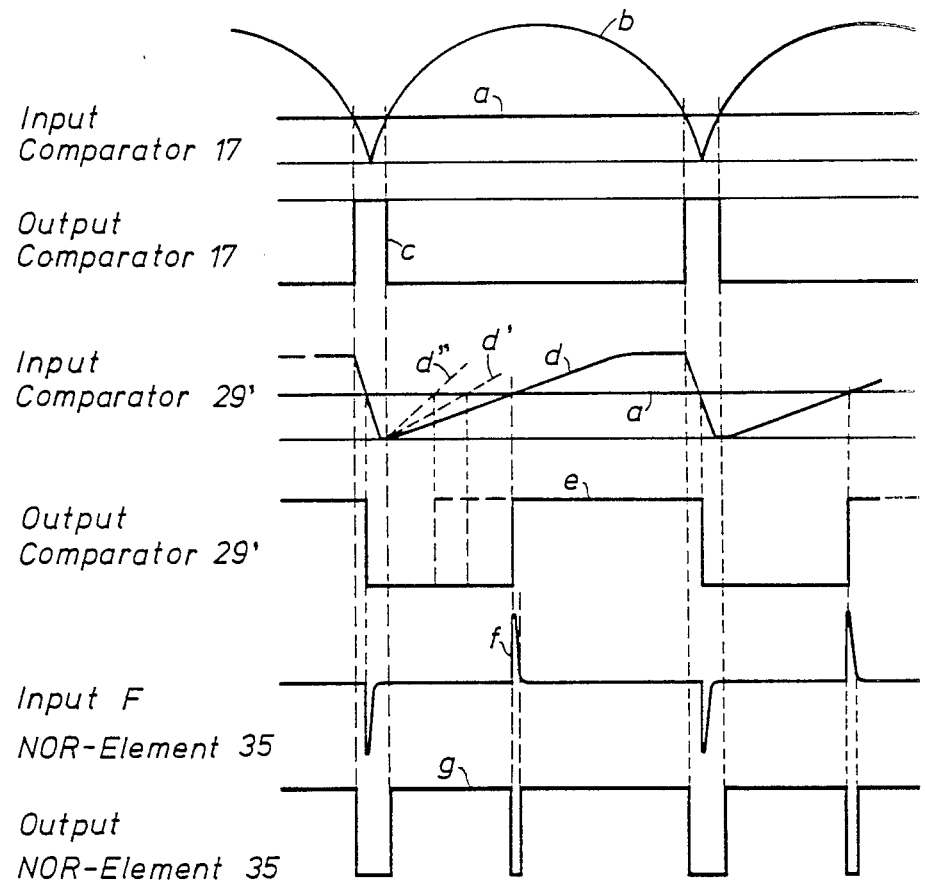
FIG. 7 is a graph that shows the course of the control and level currents at different points of the second circuit.
Figure 8:
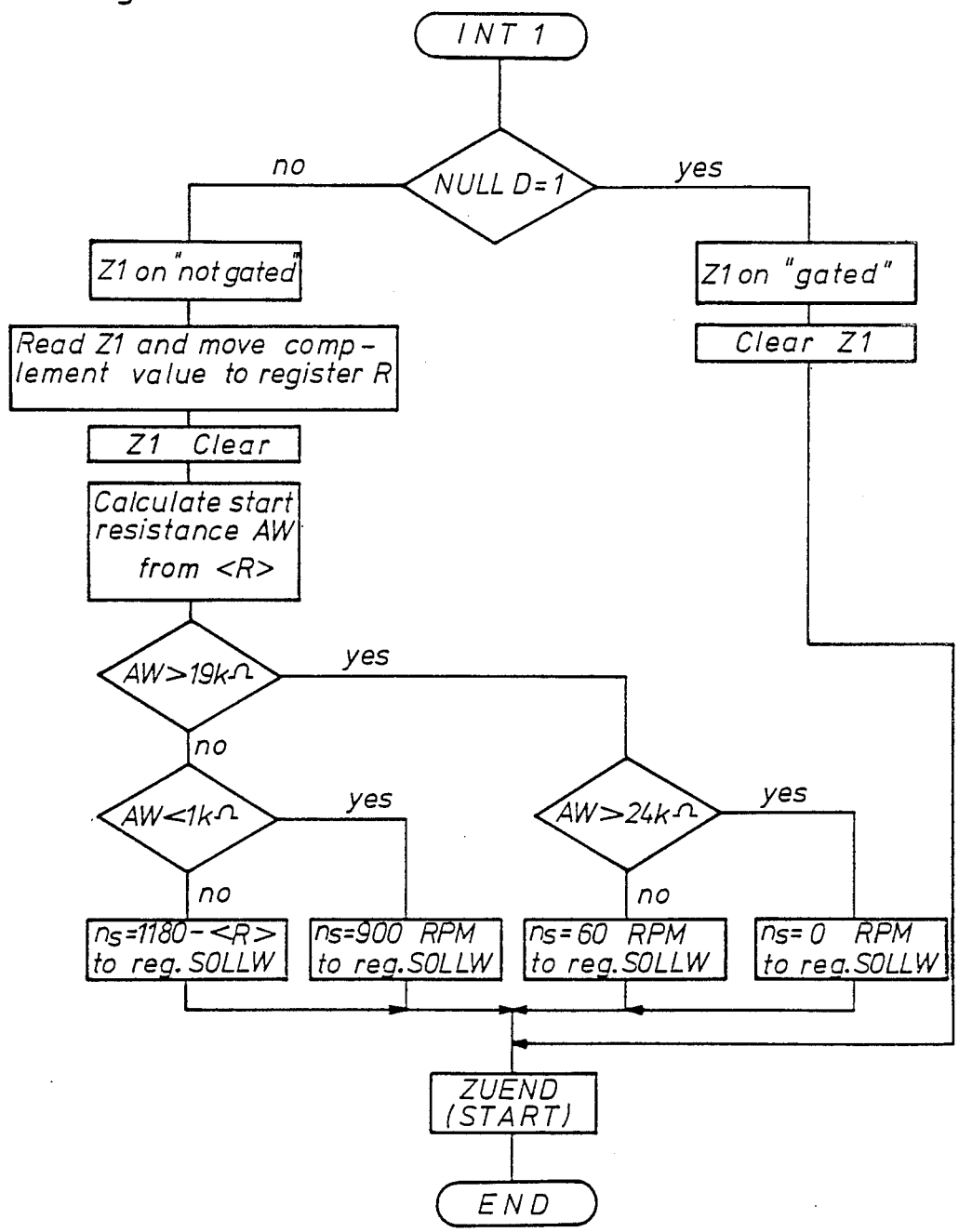
FIG. 8 is a flow diagram with details of the program process steps of the programs stored in the program storage of the microcomputer of the second circuit.

In FIGS. 6 to 8, a second embodiment of the invention is shown. In it, two internal counters Z0 and Z1 of a microcomputer 4' are used. The circuit of this embodiment therefore differs from the previously described in some details. Identical modules are labeled with identical reference numbers. A special description was omitted in their cases. Similar modules, but connected differently, have been given a primed number.

In the second embodiment (FIG. 6), the start circuit 3 is connected to an output ZUEND of the microcomputer 4'.

The output of the comparator 17 is connected across a resistance 21 to the base of an npn switching transistor 22', the emitter of which is connected to ground and the collector of which is connected to a connection 23'. This lies between two resistors 24' and 25' on one side, and a resistor 26', as well as capacitor 27' on the other. The resistors 24' to 26' and the capacitor 27' lie between the connection point 12 and ground. In this configuration, the resistors 24' to 26' and the capacitor 27' form an RC network 28'. The resistor 25' is fashioned as a potentiometer and for practical purposes is intended for manual operation.

The connecting point A between the resistors 15 and 16 of the voltage divider 14 is also connected to the inverted input of an additional comparator 29', the non-inverted input of which is connected to a connecting point 30' between the resistor 26' and the capacitor 27'. The output of the comparator 29' is connected across the resistance 31 to the stabilized voltage of the connecting point 12. In addition, the output of the comparator 29' is connected via a capacitor 33 and a resistor 34 to the input of a NOR element 35. The connection between the capacitor 33 and the resistor 34 is connected to ground via a resistor 36.

The output of the comparator 17 is connected across a resistance 37 with the connecting point 12 and directly with an input NULLD of the microcomputer 4' as well as with the second input of the NOR element 35. The output of the NOR-element is connected to an input $\overline{ANLS}$ of the microcomputer 4'.

The circuit functions as follows:

During the rotation of the motor 1, the timing disk 5 connected to the motor shaft 1a rotates and generates pulses in the clock generator 6, the trailing edges of which trigger, in each instance, at the input TAKT of the microcomputer 4', the program INT 0, the flow diagram of which is shown in FIG. 4. Compared to the first embodiment, here the internal counter Z2 is read and its value used as RPM reference value.

At the non-inverted input of the comparator 17 at point A, a voltage a is applied given by the voltage divider 14, while at the inverted input B a rectified line voltage b is present reduced correspondingly by the voltage divider 20. In FIG. 7, the course of the corresponding voltage is shown. At the output C of the comparator 17, thus, rectangular pulses c are present which are transmitted every 10 msec over the connection NULLD to the computer 4'.

The leading edge of the rectangular pulse at the output C of the comparator 17 switches the transistor 22 to pass. Thereby, the capacitor 27 is discharged over the resistance 26'. As soon as the voltage at the inverted input B of the comparator 17 exceeds the voltage at the non-inverted input A, the output C voltage of the comparator 17 switches to low. The trailing edge of the rectangular pulse c blocks the switching transistor 22'. From this point on, the capacitor 27' is charged again over the resistors 24', 25', and 26'. Depending on the setting of the resistance 25', charging takes place with different increases. In FIG. 7, the course of the voltage d is shown at one setting of the resistance 25'. The voltage rises d' and d" at two different settings of the resistance 25' are shown in dashed lines.

As soon as the voltage at the non-inverted input D of the comparator 29' exceeds the reference voltage given by the voltage divider 14 at the inverted input A, the output E voltage of the comparator 29' switches to high and thereby triggers a short control pulse f over the differentiating circuit (capacitor 33 and resistor 36). This control pulse f is transmitted to one input of the NOR element 35, whose voltage at the other input at this time is kept low, and causes its output voltage to be temporarily switched to low, and causes its output voltage to be temporarily switched to high, whereby the output of the NOR element 35 triggers in the microcomputer 4' an interrupt program INT 1.

In the interrupt program INT 1 (FIG. 8), the microcomputer 4' checks whether the voltage at its NULLD input is high. If this is the case, then the interrupt was caused by the zero passage of the line voltage, so that the following program sequence takes place:

A counter Z1, located in the microcomputer 4' is reset and switched to "gated", i.e. the counter Z1 starts to count only when the voltage in the connection $\overline{\text{ANLS}}$ is high again, thus, at the point, when the output voltage of the comparator 17 is low and charging of the capacitor 27' starts again. The time until the start pulse is calculated by the microcomputer 4' in the subprogram ZUEND (FIG. 5) in the same way as in the first embodiment and the value stored in the storage location IMPULS provided for it. The counter Z0 is loaded with the reciprocal value of this time value. This ends the line zero passage interrupt.

If the interrupt was triggered by the started measurement, at which the NULLD input voltage of the microcomputer 4' is low, the counter Z1 is stopped, read and cleared. From the counter indication, which corresponds to the time used for charging the capacitor 27', the just set value of the resistance 25' is calculated. This value is proportional to the elapsed time and, thus, also to the counter indication.

The further program sequence for calculating the RPM reference values for starting the triac 2 corresponds to the measures as they were described already for the first embodiment.

In the subprogram ZUEND, the starting angle for the control of the triac 2 is calculated from the values in the registers SOLLW and PERM and with it an internal counter Z0 is preset. This begins to count up as soon as the voltage at the NULLD input of the microcomputer 4' is high. With this, the starting point of the counter Z0 is independent of the different program execution times.

As soon as the counter Z0 has reached zero, a pulse is transmitted by the output ZUEND of the microcomputer 4' to the start circuit 3 which connects the triac 2.

While specific embodiments of the invention have been shown and described in detail to illustrate the application of the principles of the invention, it will be understood that the invention may be embodied otherwise without departing from such principles.

What is claimed is:

1. A device for regulating the RPM of a motor having an RPM generator for generating pulses with rotation of the motor, intervals of the pulses being a measure of the RPM of the motor, the device comprising a first oscillator for generating clock signals, a first counter for receiving the clock signals, the first counter having a switching input for switching the first counter on and off and for counting the number of clock signals between successive pulses of the RPM generator, a register for accepting the count from the first counter, control value means connectable to the register for receiving the count of the first counter, and for generating a control value for correcting the RPM of the motor, and a starting circuit connected in series to the motor and connected to the control value means for applying the control value to the motor, the control value to the motor, the control means comprising a RC-network including a manually adjustable control resistor and a capacitor, a second counter for determining the starting resistance of the adjustable control resistor, a second oscillator for generating pulsating signals, to the capacitor for short-circuiting the capacitor when the switch is activated, a contact mechanism for receiving the oscillator-driven pulsating signals, the contact mechanism is connected to the switch for activating the switch, and a circuit element connected to the switching input of the second counter for switching on the second counter, the contact mechanism being connected to the switching input of the second counter for delaying the switching on of the second counter.

2. A device according to claim 1, wherein the contact mechanism comprises a comparator having one input connected to a stabilized direct-current, the comparator having another input and an output, a voltage divider connected to the other input of the comparator, the voltage divider being connected to a rectified alternating-current voltage, the switch comprising a switching transistor having a base connected to the comparator output.

3. A device according to claim 1, wherein the circuit element comprises a comparator having one input connected to a stabilized direct current, another input connected to a connection between the capacitor and said control resistor of the RC-network, the comparator having an output connected to the switching input of the said counter.

4. A device according to claim 2, wherein the control value mean comprises a second comparator having an input connected to the stabilized direct current, another output connected to a connection between the capacitor and the control resistor of the RC-network, the second comparator having an output connected to the switching input of the said counter.

5. A device according to claim 4, including a diode connected between the output of the second comparator and the output of the first mentioned comparator, a third counter having a switching input for switching the further comparator on and off, a triac connected to the motor for driving the motor, the comparator being connected to the triac for starting the triac to activate the motor, the diode and the output of the first mentioned comparator being connected to the switching input of the third counter.

6. A device according to claim 1 including a differentiating circuit connected between the circuit element and the switching input of the second counter.

7. A device according to claim 6, wherein the differentiating circuit comprises a further capacitor connected to a further resistor at a connection point, the circuit element comprising a comparator having an output connected to the connection point between the further capacitor and resistor, the comparator having one input connected to a stabilized direct-current and another output connected to a voltage divider, the voltage divider being connected to a rectified alternating-current voltage.

8. A device according to claim 6 including a NOR element having one input connected to the differentiating circuit, the contact mechanism comprising a comparator having one input connected to a stabilized direct-current and another input connected to a voltage divider, the voltage divider being connected to a rectified alternating-current voltage, the comparator having an output connected to the other input of the NOR element, the NOR element having an output connected to the switching input of the second counter.

9. A device for regulating the RPM of an electric motor having an RPM generator for generating pulses with rotation of the motor, intervals of the pulses being a measure of the RPM of the motor, the device comprising: a first oscillator for generating clock signals; a first counter for receiving the clock signals generated by said first oscillator, said first counter counting the number of clock signals between the successive pulses of the RPM generator; a register for accepting the count from the first counter; control value means connectable to the register for receiving the count of the first counter, said control value means including an RC-network including a capacitor and a manually adjustable resistor, a second counter for determining the resistance value of the adjustable resistor, a switch positioned in parallel with the capacitor, the switch being operated by a contact mechanism regulated by a second oscillator, a circuit element is connected to the capacitor for switching on and off the second counter, the circuit element being connected with the switch for delaying the first switch switching on and off, said control value means for generating a control value for correcting the RPM of the motor.

10. A device according to claim 9, wherein: the contact mechanism comprises a comparator having one input connected to a stabilized direct-current, the comparator having another input and an output, a voltage divider connected to the other input of the comparator, the voltage divider being connected to a recitified alternating-current voltage, the switch comprising a switching transistor having a base connected to the comparator output.

11. A device according to claim 9, wherein: the circuit element includes a comparator having one input connected to a stabilized direct current, another input connected to a connection between the capacitor and the resistor of the RC-network, the comparator having an output connected to the switching input of the second counter.

12. A device according to claim 10, wherein: the control value means includes a second comparator having an input connected to the stabilized direct current, another output connected to a connection between the capacitor and the control resistor of the RC-network, the second comparator having an output connected to the switching input of the second counter.

13. A device according to claim 12, further comprising: a diode connected between the output of the second comparator and the output of the first comparator, a third counter having a switching input for switching the first comparator on and off, a triac connected to the motor for driving the motor, the second comparator being connected to the triac for starting the triac to activate the motor, the diode and the output of the first mentioned comparator being connected to the switching input of the third counter.

14. A device according to claim 9, further comprising: a differentiating circuit connected between the circuit element and the switching input of the second counter.

15. A device according to claim 14, wherein: the differentiating circuit comprises a further capacitor connected to a further resistor at a connection point, the circuit element comprising a comparator having an output connected to the connection point between the further capacitor and resistor, the comparator having one input connected to a stabilized direct-current and another output connected to a voltage divider, the voltage divider being connected to a rectified alternating-current voltage.

16. A device according to claim 14, further comprising: a NOR element having one input connected to the differentiating circuit, the contact mechanism comprising a comparator having one input connected to a stabilized direct-current and another input connected to a voltage divider, the voltage divider being connected to a rectified alternating-current voltage, the comparator having an output connected to the other input of the NOR element, the NOR element having an output connected to the switching input of the second counter.

17. A device for regulating the RPM of a motor having an RPM generator for generating pulses with rotation of the motor, intervals of the pulses being a measure of the RPM of the motor, the device comprising: an oscillator for generating clock signals, a counter for receiving the clock signals, the counter having a switching input for switching the counter on and off and for counting the number of clock signals between successive pulses of the RPM generator, a register for accepting the count from the counter, control value means connected to the register for receiving the count of the counter and for generating a control value for correcting the RPM of the motor, and a starting circuit connected in series to the motor and connected to the control value means for applying the control value to the motor, the control value means comprising, an RC-network including a manually adjustable control resistor and a capacitor, a switch connected to the capacitor for short-circuiting the capacitor when the switch is activated, a contact mechanism for receiving the oscillator-driven pulsating signals, the contact mechanism being connected to the switch for activating the switch, and a circuit element connected to the switch input of the counter for switching the counter, the contact mechanism being connected to the switching input of the counter for delaying the switching on of the counter.

* * * * *